Feb. 13, 1962 F. C. WELLMAN 3,021,431
TRANSISTORIZED INTEGRATOR CIRCUIT
Filed Oct. 29, 1956

INVENTOR
FRANCIS C. WELLMAN
BY Hubert L. Boettcher
ATTORNEY 3,021,431

TRANSISTORIZED INTEGRATOR CIRCUIT

Francis C. Wellman, Bellmore, N.Y., assignor to Sperry Rand Corporation, a corporation of Delaware Filed Oct. 29, 1956, Ser. No. 618,785
5 Claims. (Cl. 307—88.5)

This invention relates to integrating circuits. More particularly it concerns a novel transistorized circuit of this nature.

In the most common form of integrating circuit, the signal to be integrated is fed to a serially-connected resistor and capacitor, and the output is taken as a voltage from across the capacitor. A drawback of this circuit form, i.e., the elemental R.-C. integrating circuit, is that the rate at which the capacitor is charged is affected at each instant by the charge already attained by the capacitor at such instant. Thus, in response to a step-function input, the output of an R.-C. integrating circuit rises at a slower rate toward the end of the computing period than it does at the beginning, resulting in an exponential output vs. time characteristic rather than the linear characteristic required for perfect integration.

Improved accuracy of integration has been obtained by using the high variational plate resistance of a vacuum pentode in combination with a capacitor to form the so-called constant current pentode integrating circuit. Circuits of this nature operating as sweep generators are shown and described in Vol. 19 of the Radiation Laboratory Series, McGraw-Hill, 1949, at pp. 264–266. With these circuits, however, in order to discharge the capacitor, i.e. reset the circuit for a succeeding integration or sweep generation, it is necessary to provide a switch device in addition to the pentode. This device may, for example, be a gas-tube switch or a gated diode, and it is controlled to short-circuit the capacitor at the end of each time interval or integration or sweep generation.

The present integrating circuitry is also of the variational impedance or constant current type. But the functions heretofore provided by a pentode and a switch are now provided by one device, namely a novelly controlled transistor. In this regard, a biasing potential supplied to a transistor having a capacitor in its output is varied between two conditions. One condition of the biasing potential controls the transistor to charge the capacitor with a current dependent upon the input to the transistor but essentially independent of the capacitor's charge. The other condition of the biasing potential controls the transistor to stop charging the capacitor and cooperates with the charge on the capacitor to control the transistor to rapidly discharge the capacitor. Thus, one device is adapted to do the work of two.

The principal object of the present invention is to provide improved resettable integrating circuitry of the type wherein a capacitor is charged through a variational impedance.

Another object is the provision of a novel transistorized integrating circuit.

Another object is to provide a resettable integrating circuit wherein the same element is controlled at different times to be a high impedance source of charging current for a capacitor and a low impedance discharge path for the capacitor.

Another object is the provision of a transistor controlled by biasing means so that a capacitor in the output of the transistor is first charged by a current dependent upon the input to the transistor but essentially independent of the capacitor's charge, and then after a predetermined interval is discharged through the transistor without regard to the input to the transistor.

With the foregoing and other objects in view, the present invention includes the novel combinations and elements described below and illustrated in the accompanying figures, wherein FIG. 1 is a schematic diagram of the present invention adapted to generate a linear sweep potential;

Figure 1:
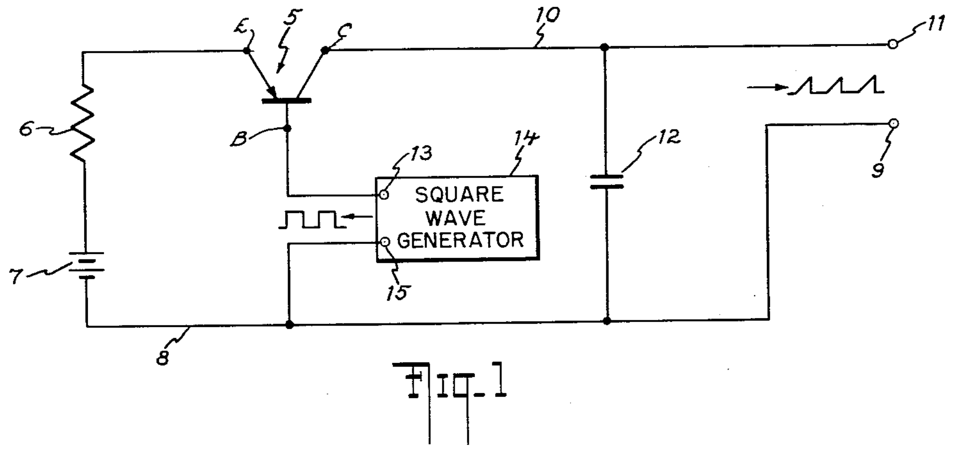
FIG. 1 depicts an integrating circuit for providing an output representing repetitive time integrals of a unidirectional input potential of constant magnitude. In this regard, FIG. 1 more specifically depicts a generator of successive linear sweep or saw-tooth potentials such as those commonly obtained from television scan and radar time base generators.

In FIG. 1, a PNP junction transistor 5 has the terminal E of its emitter electrode connected via a resistor 6 to the positive side of a battery 7 whose negative side is connected via a lead 8 to a terminal 9 forming one of the output terminals of the circuit. The terminal C of the collector electrode of transistor 5 is connected via a lead 10 to a terminal 11 forming the other of the output terminals. A capacitor 12 has one side thereof connected to lead 10 and the other side connected to lead 8 so that the output potential across terminals 9, 11 and the charge potential of capacitor 12 are one and the same.

A first output terminal 13 of a square-wave generator 14 is connected to the terminal B of the base electrode of transistor 5, and a second output terminal 15 of the generator is connected to lead 8. Generator 14 may be any of a number of well-known configurations such that the potential it produces on terminal 13 with respect to terminal 15 varies from a zero level to a given level greater than zero and of positive polarity.

Resistor 6 and battery 7 form a biasing arrangement for applying a forward bias potential to the emitter electrode, and also constitute a substantially constant current source of fixed magnitude unidirectional input potential that is repetitively integrated by the circuit. On the other hand, square-wave generator 14 forms a biasing arrangement for applying a reverse bias to the base and collector electrodes, this occurring when terminal 13 is above zero potential.

The forward emitter bias and reverse collector bias are such as to bring about normal transistor operation, whereby a substantially constant current proportional to the forward emitter current flows in the collector circuit to charge the capacitor 12. When terminal 13 is returned to zero potential, however, terminal 13 is effectively connected to lead 8 and the charge potential acquired by capacitor 12 biases the base and collector electrodes in their forward directions. Thus, it is as if a switch across capacitor 12 were suddenly closed, since insofar as capacitor 12 is concerned the change in collector bias appears to transform transistor 5 from a high impedance charging source to a simple diode poled in the proper direction to provide a low impedance discharge path for the capacitor. Terminal 13 remains at zero potential at least long enough for capacitor 12 to substantially fully discharge. Hence, when the next square wave is generated, the charge potential on capacitor 12 increases from zero, and so on to provide the desired repetitive saw-tooth output.

It is to be noted that transistor 5 preferably has what has come to be known as a common-base or grounded-base configuration, in that the input is applied between the emitter and base elements while the output is produced between the collector and base elements. This configuration is preferred over common-emitter and common-collector configurations, since it provides the highest output impedance during normal transistor operation. Thus, a greater measure of independence from capacitor potential is experienced by the charging current, resulting in virtually perfect linearity for the output.

Figure 2:
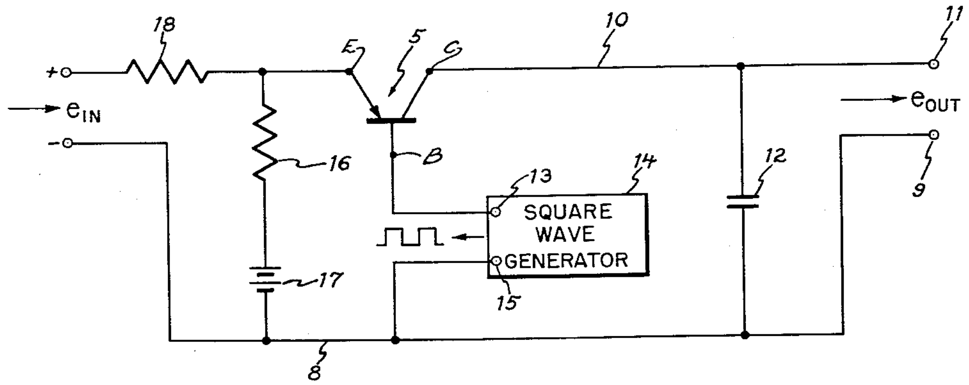
FIG. 2 is a schematic diagram of the present invention adapted to provide an output signal proportional to the time integral of a variable input signal of a given polarity.

The circuit of FIG. 1 is readily modified as shown in FIG. 2 to repetitively integrate a variable input signal of a given polarity. The modification entails the subsituation of a resistor 16 and a battery 17 for the resistor 6 and battery 7 of FIG. 1, and the addition of a resistor 18 coupling the positive terminal of the signal source to the lead connecting resistor 16 to the emitter electrode, the negative terminal being connected to lead 8.

Unlike resistor 6 and battery 7 of FIG. 1, resistor 16 and battery 17 constitute only a source of forward bias potential to the emitter electrode. This forward bias potential is insufficient in itself to operate the transistor, regardless of the output of the square-wave generator 14. But when generator 14 biases the base electrode positively and the input signal rises above zero, the transistor is operated or turned "on" to charge the capacitor 12 in dependence upon the input signal. If the input signal should return to zero at any time during a computing interval, i.e. before the positive square wave applied to the base electrode is removed, the transistor is cut off and the capacitor holds the charge attained by it up to that time. At the termination of the computing interval, the capacitor is rapidly discharged through the base-collector diode of the transistor as in FIG. 1, thereby to reset the integrator for the succeeding integration which commences when the positive square wave is again applied to the base electrode. Resistor 18 is preferably made to be sufficiently large to essentially swamp out any variations in input impedance. Hence, it is as if the emitter circuit were energized from a constant current source for any given level of input signal.

In the circuit of FIG. 2, it has been assumed that no reverse collector current (charging current) flows in the absence of an input signal. Recent developments in the design of transistors, notably of the silicon type, lend support to the validity of this assumption. Even with the germanium type transistor, the amount of such current may be so small as to have a negligible effect on the integration result.

Figure 3:
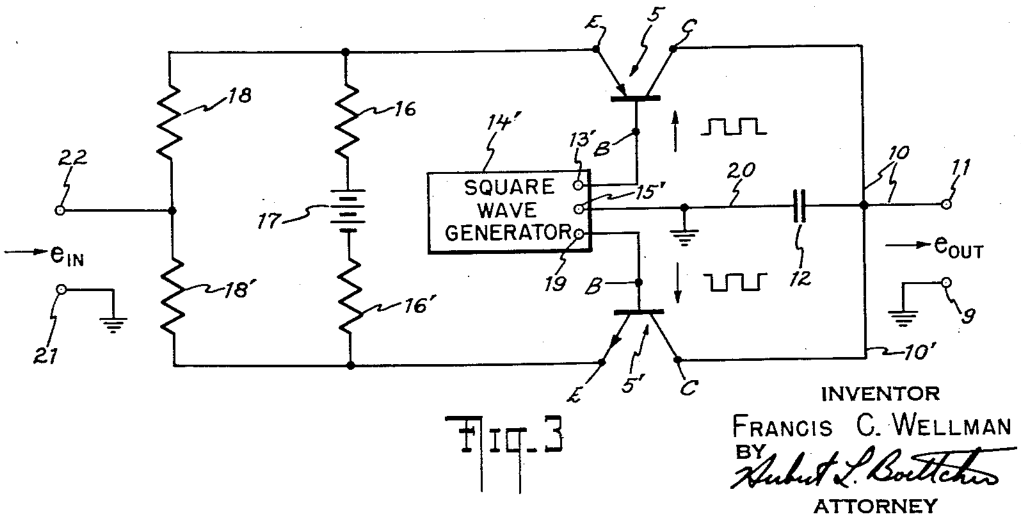
FIG. 3 is a schematic diagram of the present invention adapted to provide an output signal proportional to the time integral of a variable bi-polar input signal.

In the circuit of FIG. 3, the problem of possible collector current for zero signal is completely circumvented by using a balanced push-pull complementary-symmetry integrator embodying the present invention. In this regard, two single-ended integrators of the type shown in FIG. 2, except that one of the integrators employs an NPN transistor, are connected in parallel for the signal input, which in this instance is a bi-polar variable magnitude signal.

In FIG. 3, battery 17 supplies forward emitter biases for both the PNP transistor 5 and for an NPN transistor 5' having the same characteristics as transistor 5. Accordingly, the positive side of battery 17 is connected via resistor 16 to the emitter electrode of transistor 5 and the negative side of the battery is connected via an identical resistor 16' to the emitter electrode of transistor 5'.

A square-wave generator 14' is provided for controlling the circuit to integrate the input signal in response to one condition of the output of generator 14' and for controlling the circuit to reset itself in response to another condition of the output of generator 14'. The integrating condition of the output of generator 14' lasts for the desired computing period and applies equal reverse biases simultaneously between the collector and base electrodes of transistors 5, 5'. The output's resetting condition fully occupies the interval between each computing period and applies zero biases simultaneously to the base electrodes of transistors 5, 5'. In this regard, generator 14' is like generator 14 (FIGS. 1, 2), except that it includes an additional output terminal 19 which swings negatively from zero with respect to a terminal 15' in synchronism with positive swings of a terminal 13' from zero with respect to terminal 15'.

The side of capacitor 12 connected by lead 10 to the output terminal 11 and the collector electrode of transistor 5 is now also connected by a lead 10' to the collector electrode of transistor 5'. The other side of capacitor 12 is coupled to the common output terminal 15' of generator 14' by way of a grounded lead 20; and the integrator's other output terminal 9 is now connected to ground.

The variable bi-polar input to the integrating circuit of FIG. 3 is applied between a grounded terminal 21 and a terminal 22, the latter being connected via the resistor 18 to the emitter electrode of transistor 5 and via an identical resistor 18' to the emitter electrode of transistor 5'.

Due to the fact that a balanced complementary symmetry arrangement is employed in FIG. 3, it is possible to bias the emitter electrodes of transistors 5, 5' for Class A operation without thereby causing capacitor 12 to charge in the presence of zero input signal. Accordingly, the forward biases applied to the respective emitter electrodes by the biasing arrangement formed of battery 17 and resistors 16, 16' actually turn the transistor "on" when the respective collector electrodes are reverse biased by square-wave generator 14'. But, unless a signal input is present to unbalance the circuit, the tendency of one transistor to charge capacitor 12 in one polarity sense is cancelled out by the equal tendency of the other transistor to charge the capacitor in the opposite polarity sense.

When a positive signal input is present, it serves to increase the forward emitter bias of transistor 5 and decrease the forward emitter bias of transistor 5'—and vice-versa when a negative signal input is present. Hence, when the respective base electrodes are reverse biased by square-wave generator 14', capacitor 12 charges in a polarity sense dependent upon the polarity of the signal input. The net charge at any time during the computing period is proportional to the time integral of the input signal up to that time. At the conclusion of the computing period, i.e. when the output of square-wave generator 14' drops to zero, capacitor 12 rapidly discharges through that transistor whose collector electrode is biased in the forward direction by the charge on the capacitor. Thus, the integrating circuit is reset at the conclusion of each computing period, and is thereby placed in readiness for a repeated integration of the input signal, which integration starts as soon as the respective collector electrodes are again reverse biased by square wave generator 14'.

While the invention is described in its preferred embodiments, it is to be understood that the words used are words of description rather than of limitation, and that changes within the purview of the appended claims may be made without departing from the true scope and spirit of the invention in its broader aspects.

What is claimed is:

1. In combination, a PNP transistor, an NPN transistor, each transistor having emitter, base and collector electrodes, each electrode having a terminal, each transistor having an input and an output, a capacitor connected to said outputs to be charged by a selected one of said transistors depending on the input signal and when so charged to exert a forward bias influence on the collector of said one transistor, each transistor having associated therewith a conductive discharge path for the capacitor, each said path passing into and out of its associated transistor through the base and collector electrode terminals of that transistor, a source of bi-polar input signal connected to said inputs, and control means operative in a first sense to apply a potential in the reverse direction to the collector electrode of said PNP transistor and to simultaneously apply a potential in the reverse direction to the collector electrode of said NPN transistor so that said PNP transistor charges said capacitor in one direction in response to swings of one polarity of said bi-polar signal and said NPN transistor charges said capacitor in the opposite direction in response to swings of the opposite polarity of said bi-polar signal, said control means being operative in a second sense to remove said reverse direction potentials from said collector electrodes whereby the collector electrode of the transistor which charged the capacitor is forward-biased by the charged capacitor, and the capacitor in response to said forward bias discharges through that one of said discharge paths associated with the latter transistor in the forward direction of the collector electrode of that transistor.

2. The combination set forth in claim 1 wherein the control means is a square-wave generator.

3. An integrating circuit comprising a transistor having first, second and third electrodes, each of said first and second electrodes having forward and reverse bias directions with respect to said third electrode, a common terminal, a first voltage source connected between said first electrode and said common terminal in the forward direction of said first electrode, a capacitor connected between said second electrode and said common terminal and a second voltage source connected in series with said capacitor and said common terminal between said second and third electrodes, said second voltage source being capable of providing at different times a voltage bias in the reverse direction of said second electrode and a low-impedance connection between said second and third electrodes.

4. A device for performing integrations upon applied voltages at periodic intervals, said device comprising a transistor having first and second electrodes, each of which have forward and reverse voltage bias directions with respect to a third electrode, a junction having first, second and third terminals, means for applying said voltages to be integrated between said first electrode and said first junction terminal in the forward direction of said first electrode, a capacitor connected between said second electrode and said second junction terminal, a pair of output terminals across said capacitor and a further voltage producing means connected between said third junction terminal and said third electrode, said further voltage producing means being capable of providing at successive time intervals a voltage bias in the reverse direction of said second electrode and a substantially direct connection between said third electrode and said junction.

5. The device described in claim 4 wherein said further voltage producing means provides said bias voltage and said substantially direct connection in accordance with said periodic intervals.

References Cited in the file of this patent

UNITED STATES PATENTS

| | | |
|---|---|---|
| 2,594,449 | Kircher | Apr. 29, 1952 |
| 2,735,011 | Dickinson | Feb. 14, 1956 |
| 2,736,765 | Lohman et al. | Feb. 28, 1956 |
| 2,770,734 | Reek | Nov. 13, 1956 |
| 2,777,092 | Mandelkorn | Jan. 8, 1957 |
| 2,780,752 | Aldrich et al. | Feb. 5, 1957 |
| 2,799,784 | Harris et al. | July 16, 1957 |
| 2,820,143 | D'Nelly et al. | Jan. 14, 1958 |
| 2,864,961 | Lohman et al. | Dec. 16, 1958 |
| 2,878,384 | Holmes | Mar. 17, 1959 |
| 2,889,467 | Endres et al. | June 2, 1959 |
| 2,924,744 | Paynter | Feb. 9, 1960 |